United States Patent Office 3,551,553
Patented Dec. 29, 1970

3,551,553
LUBRICATING METAL MOLD SURFACES AND DISPERSING CARBON BLACK IN MANUFACTURE OF INORGANIC HYDRAULICALLY BONDED ARTICLES
Richard F. Shannon, Lancaster, Ohio, assignor to Owens-Corning Fiberglas Corporation, a corporation of Delaware
No Drawing. Filed Aug. 21, 1968, Ser. No. 754,481
Int. Cl. C04b 13/04, 15/16, 27/00
U.S. Cl. 264—338                                13 Claims

ABSTRACT OF THE DISCLOSURE

A method of lubricating metal molds in a process of making an inorganic, hydrated, cementitious material from aqueous slurries. A nucleophilic nonionic or cationic material selected from the group consisting of polyoxyethylene ethers, thioethers, esters, amines and amides in which the ethylene oxide comprises at least 50% of the molecule and the remainder is at least one terminal oleophilic portion is incorporated into the aqueous slurry in small amounts prior to molding. After molding the slurry and mold are heated causing the nucleophilic material to migrate out of the article and to deposit a lubricating parting layer on the metal mold surface. This additive also acts to disperse carbon black in the slurry, when it is present, to prevent "fish eyes."

BACKGROUND OF THE INVENTION

The art has long desired to incorporate carbon into cementitious products made from aqueous slurries for numerous reasons including the production of a colored product. One such product is the light weight high temperature insulation materials that are made from fiber reinforced calcium silicate crystalline binder composites. The art has tried to incorporate graphite, powdered coal, etc. into the slurries but the products have not been uniformly colored. The products, which have been produced heretofore, have in some instances had what are called "fish eyes" around the carbon particles and in other instances have had black specks and poor coloration. The art has not known why the "fish eyes" have been produced, or why the art has been unable to adequately disperse the carbon throughout the cementitious slurries.

SUMMARY OF THE INVENTION

According to the present invention, submicronic particles of carbon that are pyrolitically produced are coated with polymers and copolymers of ethylene oxide containing an abundance of nucleophilic oxygen and/or nitrogen atoms. The oxygen and/or nitrogen atoms hydrogen bond to the particles of carbon with the remainder of the molecule being more hydrophilic than lipophilic. The carbon particles thus prepared are then dispersed throughout aqueous slurries of hydratable inorganic cementitious crystalline hydrate forming materials. The slurries are thereafter heated to break the hydrogen bond between the particles of carbon and the nucleophilic groups to permit the ethylene oxide polymer and/or copolymers to be carried away with excess moisture. In the preferred arrangement the solids of the slurry are retained by metal surfaces which are heated so that the ethylene oxide forms a coating on the metal surfaces.

DESCRIPTION OF THE PREFERRED EMBODIMENTS

Example 1

A carbon dispersion is made by charging the following material to a ball mill half full with one half inch porcelain balls, and running the mill for from 20 to 22 hours:

| Ingredients: | Parts by weight |
|---|---|
| Carbon black [1] | 48.75 |
| Sodium hydroxide | 0.08 |
| Polyoxyethylene lauryl ether | 2.44 |
| Distilled water | 48.73 |

[1] The carbon black is a carbon produced by the burning of natural gas in a deficiency of air, and has a particle size that is submicronic. The dispersion has a pH of 11.9 and Brookfield viscosity (No. 3 spindle—100 r.p.m.) of 238 cps.

A slurry having a water solids ratio of 5.7 is made from the following materials:

| Materials: | Parts by weight |
|---|---|
| Amosite | 400 |
| Chrysotile | 100 |
| Quicklime | 880 |
| Supersil (95% 325 mesh silica) Pennsylvania Glass Sand Co. | 350 |
| Celatom (diatomaceous earth) Eagle-Picher Co. | 550 |
| Clay | 100 |
| Limestone | 663 |
| Liquid sodium silicate (3.75 to 1 with 32.1% solids) | 148 |
| Carbon black dispersion above prepared | 32.4 |

The slurry is prepared by mixing the asbestos in one half of the water and by mixing the quicklime and remaining powdered ingredients in the order given above, in the other half of the water. Thereafter the mixture of the powdered materials is added to the asbestos slurry and thoroughly mixed. The slurry has an active calcia to silica molal ratio of 0.725. The slurry is poured into flat open top steel molds which are then heated to approximately 200° F. in an atmospheric prehardener filled with steam. After two hours in the prehardener, the molds are fed into an autoclave that is brought up to 250 pounds pressure, over a one hour period by the introduction of steam, following which superheated steam is generated by circulating Dowtherm through heating coils in the autoclave to raise the temperature in the autoclave to 550° F. The autoclave is held at a temperature of between 525 and 550° F. for a perod of 8 hours, during which steam is vented from the autoclave, and following which the autoclave is depressurized during a one hour period. The molded product has a density of approximately 11 pounds per cubic foot, and has a crystalline binder network that is over 80% tobermorite having the formula $4CaO \cdot 5SiO_2 \cdot 5H_2O$. The finished product has a uniform gray color that is devoid of "fish eyes," light spots, or undispersed particles of carbon.

In the above formulation, the clay supplies active silica as well as a beneficial amount of alumina. The limestone is used as a filler. The liquid sodium silicate improves the consistency of the slurry.

It is found that the polyoxyethylene lauryl ether not only provides a uniform distribution of carbon black throughout the slurry but that it lubricates the molds, so that the hardened and dried product can be easily removed therefrom without the usual application of lubricants such as a motor oil to the surface of the mold prior to the introduction of the slurry. After three or four molding operations, a thin layer of material of approximately 1/32 to 1/16 inch builds up on the molds and remains at this thickness. It appears that the polyoxyethylene lauryl ether is driven off of the carbon by the elevated temperature in the autoclave, so that it is thereafter free to migrate with the water. In the autoclave, the superheated steam is driven past the surfaces of the mold which in turn heat the product therein. Because the temperature of the mold is greater than that of the product, excess water is evaporated adjacent the surface of the mold, so that a high percentage of the water of the product becomes evaporated at the surface of the mold. The polyoxyethylene molecules migrate with the water and build up on the surface of the mold. While some break down of the polyoxyethylene may occur, it is gradual and leaves the polyoxyethylene material along with carbon and other bits of material to provide a lubricating coating on the surface of the mold.

Example 2

The process of Example 1 was repeated excepting that powdered graphites of submicronic size was substituted for the carbon black. This material gives the same uniform dispersion and mold lubrication as does the material of Example 1.

Example 3

A carbon black dispersion was made as in Example 1 above excepting that polyoxyethylene sorbitan was substituted for the polyoxyethylene lauryl ether.

A material having a xonolite crystalline structure was made from the following ingredients:

| Ingredients: | Parts by weight |
|---|---|
| Amosite | 300 |
| Chrysotile | 200 |
| Quicklime | 750 |
| Supersil | 780 |
| Carbon black dispersion of Example 1 | 22 |
| Limestone | 165 |

This material has an active CaO to $SiO_2$ ratio of 1.017. A slurry was made of this material using a 4.71 water to solids ratio and the material was cast and autoclaved as described in Example 1. The material was uniformly colored without "fish eyes" or particles of carbon and the surfaces of the mold were lubricated as described above in Example 1.

Example 4

A slurry having a water to solids ratio of 4 to 1 is made using a hundred pounds of high early strength portland cement, one hundred parts of amosite asbestos, and two parts of the carbon emulsion described in Example 1. The material is poured into steel molds to form blocks one inch thick and the molds are hardened for 2 days at atmospheric pressure in a steam filled room at approximately 200° F. Thereafter the molds are placed on a heated surface and raised to a temperature of 200° F. to dry. The product is uniformly colored and the pans become lubricated as described in Example 1 above.

Example 5

A slurry containing one hundred parts of an aluminous cement purchased under the trade name of Lumnite, one hundred parts of amosite asbestos, one hundred parts of water and 3 parts of the carbon black dispersion prepared as described in Example 1 above is made. The material is cast into steel pans in a one inch layer. The molds are kept covered to prevent escape of moisture and the material is allowed to harden for two days. Thereafter the molds are placed on a heated surface and the temperature of the molds slowly raised to 350° F. until the product is dried. The product is uniformly colored and the molds lubricated as described in Example 1.

Example 6

A slurry containing 3% magnesium oxide, 15% magnesium sulfate, 1% of the carbon black dispersion prepared as described in Example 1 above, and the balance water is prepared. A hundred parts of Refrasil[1] glass fibers approximately one-half inch long are tumbled with the above slurry and the material poured into a mold. The mold is covered and the contents allowed to harden for 24 hours. The mold thereafter is placed on a heated surface and slowly raised to a temperature of 350° F. until dried. The product is uniformly colored and the mold lubricated as described in Example 1 above.

Example 7

A slurry is made using 30 parts of monoaluminium prosphate, 1 part of the carbon black dispersion prepared as described in Example 1 above, 89 parts of a silica sol, and 22 parts of water. Mineral fibers one-half inch long are tumbled with the slurry until coated, and the material is poured into stainless steel molds which are covered and the material allowed to harden for 24 hours. Thereafter the material is uncovered and placed on a heated surface to raise the mold temperature to 350° F. until the material is dried. The material is uniformly colored and the mold lubricated as described in Example 1 above. Other silica phosphates binders which can be used are disclosed in U.S. Pat. 2,479,504.

Examples 8 through 13

The process of Example 1 is repeated excepting that the following materials are substituted for the polyoxyethylene lauryl ether used in Example 1:

| Example: | Hydrogen bonding material |
|---|---|
| 8 | Monsanto SK (polyoxyethylene thioether). |
| 9 | Monsanto Sterox AJ (polyoxyethylene ether). |
| 10 | Monsanto Sterox CD (polyoxyethylene ester). |
| 11 | Monsanto Sterox DF (alkyl phenol ethylene oxide adduct). |
| 12 | Stepan Co. Stepanol TBK (alkoxypolyoxyethylene ethanol). |
| 13 | Atlas Co. Atlas G1292 (polyoxyethylene fatty glyceride). |

The carbon black material prepared using materials of Examples 8 through 13 gave a product uniformly colored and molds that were lubricated as described as in Example 1 above.

It will be apparent that carbon colored composites of inorganic crystalline hydrate binders, can be uniformly colored using any polyoxyethylene hydrophilic material as for example polyoxyethylene ethers, esters, thioethers, amines, amides and copolymers in which the ethylene oxide comprises at least 50% of the molecule and the remainder of the molecule does not make either half of the molecule repel water. The material is preferably of higher molecular weight but still a liquid in order that it can easily wet out the carbon. Any type of inorganic binder that sets from aqueous slurries by water of crystallization can be used, and any type of fiber which will withstand these conditions can be used. The groups attached to the nucleophilic polyoxyethylene material can be nonionic or ionic but must not make either half of the molecule oleophilic and should not be anionic to where the anionic end attaches to the carbon. The nonionic materials are preferred to plate out the surface of the mold. The amount of the nucleophilic carbon bonding material will vary with the amount of carbon used and will usually constitute approximately 10% of the carbon, but may vary from approximately 5% to approximately 20%. In those instances where only lubrication of the mold is required, the nucleophilic materials can be added to the slurry in amounts of from 0.01% to approximately 1%. Any type of carbon can be used so long as it is submicronic in size and preferably below 0.5 micron and most preferably above approximately 100 millimicron.

According to conventional surface active agent chemistry, the surface active agent molecules have an oleophilic portion and a lipophilic portion. Oils have been dispersed heretofore by causing the oleophilic portion to orient to the surface of the oil particles while the hydrophilic portion projected therefrom to be surrounded by water and thus suspend the oil particles. When carbon particles ---
[1] Refrasil are acid leached glass fibers of a high $SiO_2$ purity of more than approximately 98%.

are treated with such substances, it might be expected that the oleophilic portion would attach to the carbon and the hydrophilic portion would project therefrom to be attracted by the water and suspend the particle.

The art has long known that anionic surfactants are most effective with particles of carbon and therefore the prior art has almost universally used conventional anionic surfactants to disperse carbon.

According to the invention, it has been discovered that the hydrophilic portion of a conventional surfactant molecule attaches to the carbon instead of the oleophilic portion, and that this accounts for the "fish eyes," and the large spaced apart particles of carbon. According to the invention, more adequate dispersions of the carbon are had in aqueous slurries of inorganic materials by using higher molecular weight molecules of ethylene oxide having a minimum of alkyl and aryl groups attached thereto than by using convntional surface active agents having a strong lipophilic end portion. Carbon particles are almost always produced by the pyrolysis of carbonaceous materials, and it is now believed that this pyrolysis at high temperatures splits off electrons leaving the carbon positively charged. The hydrophilic portion of surfactant molecules therefore orients to the carbon particle leaving the oleophilic portions surrounding the particles to exclude water therefrom and therefore produce the light areas known as "fish eyes." According to the invention, molecules having a minimum of oleophilic atoms and which contain oxygen and/or nitrogen hydrogen bond to the positively charged carbon, and because the oleophilic groups are at a minimum, water is attracted to the molecules to in turn suspend the carbon particles. The ethylene oxide containing molecules may have nonionic or cationic groups but preferably do not contain anionic groups. Where they contain a strong anionic group, the anionic group will attach to the carbon and the ethylene oxide project therefrom. Where they contain cationic groups, the ethylene oxide will attach to the carbon, and the cationic groups project therefrom. In either case water will be drawn about the molecules to suspend the carbon particles. A preferred arrangement, however, is had using a nonionic molecule having an abundance of nucleophilic groups. When the slurry containing the carbon particles suspended by the nonionic nucleophilic material is heated, the hydrogen bond between the carbon and the nucleophilic materials is broken, because hydrogen bonds are weak bonds broken by temperature. Thereafter, the nucleophilic molecules separate from the carbon particle, and migrate with the water during the drying process. Where heated metal molding surfaces are used the nucleophilic molecules will migrate to the metal molding surface to provide a beneficial lubricating effect between the molded product and the forming surface. Still other beneficial effects will become apparent to those skilled in the art.

Example 14

A slurry was made of the following composition:

| Ingredients: | Parts by weight |
|---|---|
| Quicklime | 275 |
| Portland cement | 150 |
| Diatomaceous earth | 465 |
| Chrysotile | 100 |
| Carbon black dispersion of Example 1 | 32 |
| Water | 20,000 |

The slurry was passed through a filter press which retained the solids in the shape of pipe insulation 1 inch thick. The solids were then autoclaved as in Example 1 to produce a product having the same advantages as in Example 1.

While the invention has been described in considerable detail, I do not wish to be limited to the particular embodiments described, and it is my intention to cover hereby all novel adaptations, modifications, and arrangements thereof which come within the practice of those skilled in the art to which the invention relates.

I claim:

1. The method of producing colored products from aqueous slurries of inorganic crystalline binder forming materials comprising: preparing an aqueous slurry comprising a hydratable inorganic cementitious material, fillers therefor, and a coloring agent consisting essentially of particles of carbon that are submicronic in size and which are treated with up to 20%, by weight of the carbon, of a liquid nucleophilic water dispersible material from the group consisting of nonionic and cationic polyoxyethylene ethers, thioethers, esters, amines and amides in which the ethylene oxide comprises at least 50% of the molecule and the remainder is at least one terminal oleophilic portion, placing the slurry in a metal mold, heating mold and slurry therein to break hydrogen bonds between the ethylene oxide and the carbon, and drying the product.

2. The method of claim 1 wherein the carbon is carbon black.

3. The method of claim 1 including the steps of: decomposing carbonaceous material under pyrolytic conditions to produce positively charged submicronic particles, and treating the particles with the nucleophilic nonionic water dispersible material before incorporation into the slurry.

4. The method of claim 1 wherein the carbon particles are violently agitated with the nucleophilic material to subdivide agglomerates before incorporation into the slurry.

5. The method of claim 4 wherein the nucleophilic material is a polyoxyethylene lauryl ether.

6. The method of claim 1 wherein the solids of the slurry are confined by a metal surface and the metal is heated.

7. The method of claim 6 wherein the slurry is poured into a metal mold and the mold is heated to dry the contents.

8. The method of claim 6 wherein the cementitious material comprises reactive lime and reactive silica and the heating step comprises autoclaving to produce a calcium silicate binder.

9. The method of producing colored products from aqueous slurries of inorganic crystalline binder forming materials comprising: mixing submicronic particles of a coloring agent consisting essentially of carbon black with water and up to 20%, based on the weight of the carbon black, of a liquid nucleophilic nonionic water dispersible material from the group consisting of polyoxyethylene ethers, thioethers, and esters in which the ethylene oxide comprises at least 50% of the molecules and the remainder is at least one terminal oleophilic portion, to break up agglomerates and produce a fine dispersion of the carbon black, preparing an aqueous slurry of reactive lime and reactive silica, reinforcing, fibers, fillers and carbon black dispersion, placing the slurry in a metal mold, heating the mold and slurry to free the nucleophilic material from the carbon black, causing the reactive lime and reactive silica to harden into a calcium silicate binder, and drying the product.

10. The process of claim 9 wherein the slurry is poured into molds, the molds and contents are autoclaved, and heat is caused to flow through the molds to the contents to evaporate water from the contents.

11. The method of producing composites comprising inorganic crystalline hydrate binders, by the steps of: preparing an aqueous slurry of hydratable inorganic cementitious material and from 0.01 percent to approximately 1%, by weight of solids, of a liquid nucleophilic water dispersible material from the group consisting of nonionic and cationic polyoxyethylene ethers, thioethers, esters, and copolymers in which the ethylene oxide comprises at least 50% of the molecule and the remainder is at least one terminal oleophilic portion, confining the slurry within metal surfaces, and heating the metal surfaces to evaporate the water and produce a film of the nucleophilic material.

12. The method of claim 11 wherein the nucleophilic material is a polyoxyethylene ether.

13. The method of claim 11 wherein the nucleophilic material is a polyoxyethylene lauryl ether.

References Cited

UNITED STATES PATENTS

| | | | |
|---|---|---|---|
| 2,654,674 | 10/1953 | Frankenhoff | 106—90 |
| 2,665,977 | 1/1954 | Engelhart | 106—90 |
| 2,867,540 | 1/1959 | Harris | 252—313 |
| 2,981,665 | 5/1961 | Wilcox | 252—313 |
| 3,023,118 | 2/1962 | Donnet | 106—307 |
| 3,117,882 | 1/1964 | Herschler et al. | 106—90 |
| 3,118,844 | 1/1964 | Forrester et al. | 252—313 |
| 3,219,467 | 11/1965 | Redican et al. | 106—90 |
| 2,851,330 | 9/1958 | Taylor | 264—338 |
| 3,354,180 | 11/1967 | Ekiss et al. | 264—338 |

FOREIGN PATENTS

| | | | |
|---|---|---|---|
| 692,034 | 8/1964 | Canada | 264—86 |
| 476,797 | 12/1937 | Great Britain | 252—313 |
| 571,164 | 8/1945 | Great Britain | 252—313 |
| 597,944 | 2/1948 | Great Britain | 106—90 |

DONALD J. ARNOLD, Primary Examiner

J. H. MILLER, Assistant Examiner

U.S. Cl. X.R.

106—90, 307, 308; 252—313; 264—42